(12) United States Patent
Zhu et al.

(10) Patent No.: US 11,172,044 B2
(45) Date of Patent: Nov. 9, 2021

(54) CONTENT BASED BYTE-RANGE CACHING USING A DYNAMICALLY ADJUSTED CHUNK SIZE

(71) Applicant: Telefonaktiebolaget LM Ericsson (Publ), Stockholm (SE)

(72) Inventors: Zhongwen Zhu, Saint-Laurent (CA); Julien Grillon-Labelle, Montreal (CA)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 16/497,681

(22) PCT Filed: Apr. 18, 2017

(86) PCT No.: PCT/IB2017/052219
§ 371 (c)(1),
(2) Date: Sep. 25, 2019

(87) PCT Pub. No.: WO2018/193287
PCT Pub. Date: Oct. 25, 2018

(65) Prior Publication Data
US 2020/0028931 A1 Jan. 23, 2020

(51) Int. Cl.
*G06F 15/167* (2006.01)
*H04L 29/08* (2006.01)
(Continued)

(52) U.S. Cl.
CPC ...... *H04L 67/2842* (2013.01); *H04L 41/0896* (2013.01); *H04L 65/607* (2013.01); *H04L 67/1097* (2013.01)

(58) Field of Classification Search
CPC ............. H04L 67/2842; H04L 67/1097; H04L 41/0896; H04L 65/607
(Continued)

(56) References Cited

U.S. PATENT DOCUMENTS 10,732,852 B1 * 8/2020 Ma .................. G06F 3/0671
2005/0203673 A1 9/2005 El-Hajj et al.
(Continued)

FOREIGN PATENT DOCUMENTS

EP 2 360 923 A1 8/2011

OTHER PUBLICATIONS

International Search Report and Written Opinion dated Oct. 10, 2017 issued in PCT Application No. PCT/IB2017/052219, consisting of 10 pages.
(Continued)

*Primary Examiner* — Wing F Chan
*Assistant Examiner* — Joseph R Maniwang
(74) *Attorney, Agent, or Firm* — Christopher & Weisberg, P.A.

(57) ABSTRACT

A network node (20) operative to adjust chunk size is provided. The network node (20) includes processing circuitry (34) having a processor (36) and memory (38). The memory (38) includes executable instructions which, when executed by the processor (36), configure the processor (36) to: determine at least one measured 5 performance characteristic associated with the network, dynamically adjust a chunk size for caching each of a plurality of segments of at least a portion of content, cause transmission of a content request, according to the dynamic adjustment of the chunk size, for at least one segment of the plurality of segments of at least the portion of the content. The dynamic adjustment of the chunk size is based on the at least one 10 measured performance characteristic associated with the network.

27 Claims, 11 Drawing Sheets

(51) Int. Cl.
*H04L 12/24* (2006.01)
*H04L 29/06* (2006.01)

(58) Field of Classification Search
USPC .......................................................... 709/213
See application file for complete search history.

(56) References Cited

U.S. PATENT DOCUMENTS

| | | |
|---|---|---|
| 2006/0167922 A1 | 7/2006 | Poyourow |
| 2008/0114889 A1 | 5/2008 | Deshpande |
| 2010/0318632 A1* | 12/2010 | Yoo ..................... H04L 67/2842 |
| | | 709/219 |
| 2012/0030723 A1 | 2/2012 | Baum et al. |
| 2013/0212074 A1 | 8/2013 | Romanski et al. |
| 2016/0006805 A1* | 1/2016 | Ulupinar ............... H04L 69/166 |
| | | 709/217 |
| 2016/0344781 A1 | 11/2016 | Gyimesi et al. |
| 2017/0013040 A1 | 1/2017 | Ponekker et al. |

OTHER PUBLICATIONS

Wikipedia https://en.wikipedia.org/wiki/Byte_serving "Byte Serving" Aug. 26, 2016, consisting of 2 pages.
Internet Engineering Task Force (IETF) "Hypertext Transfer Protocol (HTTP/1.1): Range Requests"; Request for Comments: 7233; Category: Standards Track; Jun. 2014, consisting of 25 pages.
Carroll, Alan M. https://cwiki.apache.org/confluence/display/TS/Partial+Object+Caching; "Partial Object Caching—Traffic Server—Apache Software Foundation"; Jan. 4, 2017, consisting of 1 page.
Garrett, Owen; nginx.com/blog/smart-efficient-byte-range-caching-nginx/ "Smart and Efficient Byte-Range Caching With NGINX & NGINX Plus"; Jan. 21, 2016, consisting of 10 pages.

* cited by examiner

| CONTENT URL | TIME INTERVAL (MS) | ACCUMULATED BYTE RANGES FROM CLIENT REQUEST (BYTES) | COUNTS (N) | LATENCY FROM ORIGIN SERVER (MS) | TOTAL CONTENT SIZE (BYTES) |
|---|---|---|---|---|---|
| //WWW.SITE.COM/MOVIE /CONTENT.MP4 | 0-10 | 100000 | 100 | 10 | 20,000,000 |
| | 10-20 | 2000000 | 50000 | 30 | |
| | 20-30 | 150000 | 900 | 5 | |
| | 30-40 | 30000 | 5000 | 20 | |
| | 40-50 | 4000000 | 32000 | 40 | |
| | 50-60 | 600000 | 30000 | 20 | |

INFORMATION BASED ON CLIENT REQUESTS

INFORMATION ASSOCIATED WITH ORIGIN SERVER 24

LATENCY: TTFB OR TTLB

FIG. 9

CONTENT BASED BYTE-RANGE CACHING USING A DYNAMICALLY ADJUSTED CHUNK SIZE

CROSS-REFERENCE TO RELATED APPLICATIONS

This application is a Submission Under 35 U.S.C. § 371 for U.S. National Stage Patent Application of International Application Number: PCT/IB2017/052219, filed Apr. 18, 2017 entitled "CONTENT BASED BYTE-RANGE CACHING USING A DYNAMICALLY ADJUSTED CHUNK SIZE," the entirety of which is incorporated herein by reference.

TECHNICAL FIELD

The disclosure relates to content distribution networks, and in particular, to byte-range caching using a dynamically adjusted chunk size.

BACKGROUND

The demand for delivery of network-based content continues to increase as more content becomes available and more devices connect to networks such as the Internet. Content delivery networks (CDN) are being implemented to support this increase in content demand. CDNs include one or more delivery nodes, i.e., cache servers, that cache content, i.e., media files, for retrieval, and typically deliver the content to a massive number of end user devices. CDNs also include one or more origin servers that store the content and act as a source of the content for various delivery nodes. For a large media file, it is not efficient for the delivery node to fetch a whole media file from an origin server that stores the file, and cache the large media file in a local cache while simultaneously handling a high volume of traffic.

One existing solution to this efficiency problem is to pre-position the media file in the delivery node ahead of time, and then to serve the content to end users, in the future, upon request. In this way, a delivery node's response to an incoming request for content does not depend on content acquisition from the origin server. However, pre-positioning content is not always possible, especially for unplanned and unanticipated events or requests for content.

Another existing solution to this efficiency problem is to split one single request for content into multiple byte-range requests for content. For example, instead of fetching a whole content or media file in one acquisition task or request, the file is ingested, i.e., retrieved from the origin server, through multiple chunks or media file segments, which can be served to end user devices quickly with low end-to-end latency when Time-To-First-Byte (TTFB) is considered.

For example, a byte-range caching (BRC) process may be used for splitting a single request for content into multiple byte-range requests for content. The BRC system is used by many existing caching servers, i.e., delivery nodes, on the market to deal with large media files delivery. One type of BRC system provides two options for handling Byte-Range requests:

Option 1: Default BRC behavior (cache a whole file)—once the entire content has been cached, the delivery node services byte-range requests from clients, i.e., user equipment, directly from the cached copy on disk/memory of the delivery node. When the delivery node receives a byte-range request for un-cached content, the delivery node requests the entire file, not a byte-range, from the origin server, and begins streaming the response to temporary storage of the delivery node. As soon as the delivery node receives the data required to satisfy the client's original byte-range request, the delivery node sends the requested byte-range of content to the client. In the background of this process, the delivery node continues streaming the full media file to a file in the temporary storage. When the transfer of the full media file is complete, the delivery node moves the file to the delivery node's cache.

Option 2: Filling the cache slice-by-slice—In implementing the cache slice-by-slice process, the delivery node breaks the requested content into smaller segments and requests each segment when it is required. The segments are accumulated in the cache of the delivery node, and requests for the content are satisfied by delivering appropriate parts of one or more segments of the content to the client. A request for a large byte-range of content or the entire file of the content triggers sub-requests for each of the required segments of content, which are cached as they arrive from the origin server. As soon as all the segments are cached, the delivery node assembles the content from the cached segments and sends the content in response to the client's request.

The BRC system described above may work for homogenous contents, i.e., content that has similar characteristics especially with respect to file size, but the efficiency of the system starts to fade when the requested contents are heterogeneous, i.e., contents of diverse characteristics especially with respect to file size. For instance, if the caching server, i.e., delivery node, only handles movies having a duration of one hour and a half, this means that the size of each media file is approximately 16 Gigabytes. In this situation, it is easy to choose a chunk size for splitting the media file in segments as all the requested movies/content is of similar file size. However, in a real-life deployment scenario, content comes in the form of a mixture of video, gaming and web traffic that is sent through the same delivery node. Therefore, the delivery node typically handles heterogeneous content instead of homogenous content.

FIG. 1 is a block diagram of an existing BRC system 10 that suffers from various problems when the delivery nodes having fixed chunk sizes handle heterogeneous contents. In FIG. 1, client device 12 requests content via a client request, i.e., byte-range request, that may overlap one or more fixed segment size(s) defined by the fixed chunk size(s) that are predefined for delivery node 14, thereby requiring one or more content requests, i.e., normalized byte-range requests, to the origin server for content. As used herein, client request corresponds to a range of bytes of segment(s) of content requested by the client or byte-range request. Also, as used herein, content request corresponds to a normalized range of bytes of segment(s) of content requested by the delivery node or a normalized byte-range request, as described below. For example, if a client transmits a client request (byte-range request) for bytes 550 to 780 of content, and the fixed chunk size of the delivery node is 100 bytes, the content request (normalized byte-range request) to origin server will be for bytes 500 to 799 of content, i.e., for segments of bytes 500-599, 600-699 and 700-799. Each segment size corresponds to the fixed chunk size in system 10 in existing systems. The delivery node will receive a normalized byte-range response for bytes 500 to 799 of content, per the content request. Then the delivery node will cache these bytes, and then transmits a response to the client with byte ranges 550 to 780 bytes, per the client request.

The problems associated with system 10 are:

1. If the fixed chunk size for requesting segments from origin server 16 is set according to a small media file, the setting will lead to too many requests for segments of a large media file when a larger media file is requested. Hence the caching server, i.e., delivery node 14, will have to deal with a large number of small size segment files. This might, for example, disadvantageously cause a high number of WRITE and READ I/O operations of the delivery node's file system, which leads to high CPU usage, which will eventually have a negative impact on serving further incoming client requests due to limited delivery node resources. Further, if client 12 requests a large byte-range, via a client request, when the delivery node 14 has been configured with a small fixed chunk size, the caching server, i.e., delivery node 14, will have to request segments of content from origin server 16 more often in order to get the small segments. This then disadvantageously wastes limited computational resources, such as CPU resources, of delivery node 14. As used herein, a small fixed chunk size refers to a fixed chunk size used by delivery node 14 that is smaller in size than a large fixed chunk size.

2. If the fixed chunk size is initially set according to large media file requests, this results in the delivery node 14 having a large fixed chunk size. This then leads to requesting few large segments from origin server 16 for a client request corresponding to a small media file request. So, when the content is getting popular, time-to-the-first-byte (TTFB) increases due to latency for fetching large segment(s) from origin server 16. This has a negative impact on performance when the content is being served to a massive number of clients at the same time. In particular, the size of large segment(s) will correspond to the large fixed chunk size that might take a large percentage of the storage of the fast memory, e.g., solid state drive (SSD), of delivery node 14. This has a negative impact on the caching server, i.e., delivery node 14, when serving other client requests using SSD as the fast memory resources are being inefficiently used for the large segment(s). In other words, if client 12 requests correspond to only a small byte-range, but the fixed chunk size at delivery node 14 is large, this will force delivery node 14 to fetch a segment file much larger than that which client 12 requested, thereby wasting limited resources, such as network bandwidth and storage usage. Further, inefficient bandwidth usage between delivery node 14 and origin server 16 affects latency from origin server's 16 response, and thereby becomes a problem for content distribution.

Further, at the beginning of the BRC process, when the content has not been cached, delivery node 14 proxies the request to origin server 16 according to the large fixed chunk size, even though the request from client 12 corresponds to only a small byte-range. This situation disadvantageously takes not only a lot of bandwidth usage between delivery node 14 and origin server 16, but also puts these large segments into the storage device of delivery node 14 using extensive WRITE operations (which cause a bottle neck for storing the contents in the node), thereby inefficiently using limited resources of delivery node 14.

Therefore, while using a predefined and fixed chunk size for serving requests for homogenous contents may work efficiently, this existing fixed chunk size scheme quickly starts to inefficiently use resources when servicing client requests for heterogeneous contents.

SUMMARY

How to find the right chunk size for servicing client requests in BRC systems is a challenging question. One solution to this question is based upon the total length of the content file and the number of segments (pre-configured) such that the chunk size can be calculated and fixed. In this case, the calculated chunk size will vary with the size of the content file. However, this solution poses another question, which is: how should the number of segments be configured and what is an optimal segment value, i.e., chunk size, for all content handled in the caching server, as recalculating the chunk size for every client request based on the requested size of the content file is simply not a reasonable solution in real life system.

The instant disclosure solves one or more of the problems with existing systems by providing an intelligent way to dynamically adjust a chunk size of the delivery node to address above described issues. In other words, instead of preconfiguring a chunk size to be used for all requests for both homogenous and heterogeneous contents, the chunk size is dynamically adjusted as discussed herein.

The dynamic adjustment of the chunk size provides several advantages over known solutions. For example, at least one advantage for a CDN Operator is that the CDN operator can utilize the caching server, i.e., delivery node 14, to deal with a mixture of traffic patterns, hence maximizing the use of the caching servers deployed within CDN. At least one other advantage for the content provider is that the risk to have a traffic overload at the content provider's origin server 16 is reduced, thereby benefiting from fast response times from the caching server to its subscriber's/client's request. Eventually, the fast response time advantageously attracts more clients to join the content provider's service. Also, at least on advantage for the client is that the client benefits by having a good user experience such as due to the fast response time.

Some embodiments advantageously provide a method and network node for dynamic adjustment of the chunk size.

A network node operative to adjust chunk size is provided. The network node includes processing circuitry having a processor and memory. The memory includes executable instructions which, when executed by the processor, configure the processor to: determine at least one measured performance characteristic associated with the network, dynamically adjust a chunk size for caching each of a plurality of segments of at least a portion of content, cause transmission of a content request, according to the dynamic adjustment of the chunk size, for at least one segment of the plurality of segments of at least the portion of the content. The dynamic adjustment of the chunk size is based on the at least one measured performance characteristic associated with the network.

A method for a network node operative to adjust chunk size is provided. At least one measured performance characteristic associated with the network is determined. A chunk size for caching each of a plurality of segments of at least a portion of content is dynamically adjusted. The dynamic adjustment of the chunk size is based on the at least one measured performance characteristic associated with the network. Transmission of a content request is caused, according to the dynamic adjustment of the chunk size, for at least one segment of the plurality of segments of at least the portion of the content.

A network node operative to adjust chunk size is provided. The network node includes chunk adjustment module configured to: determine at least one measured performance characteristic associated with the network, dynamically adjust a chunk size for caching each of a plurality of segments of at least a portion of content, and cause transmission of a content request, according to the dynamic adjustment of the chunk size, for at least one segment of the plurality of segments of at least the portion of the content. The dynamic adjustment of the chunk size is based on the at least one measured performance characteristic associated with the network.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein:

FIG. 9 is a block diagram of an example of information received from access logger and origin-FS feedback component in accordance with the principles of the disclosure;

DETAILED DESCRIPTION

Figure 1:
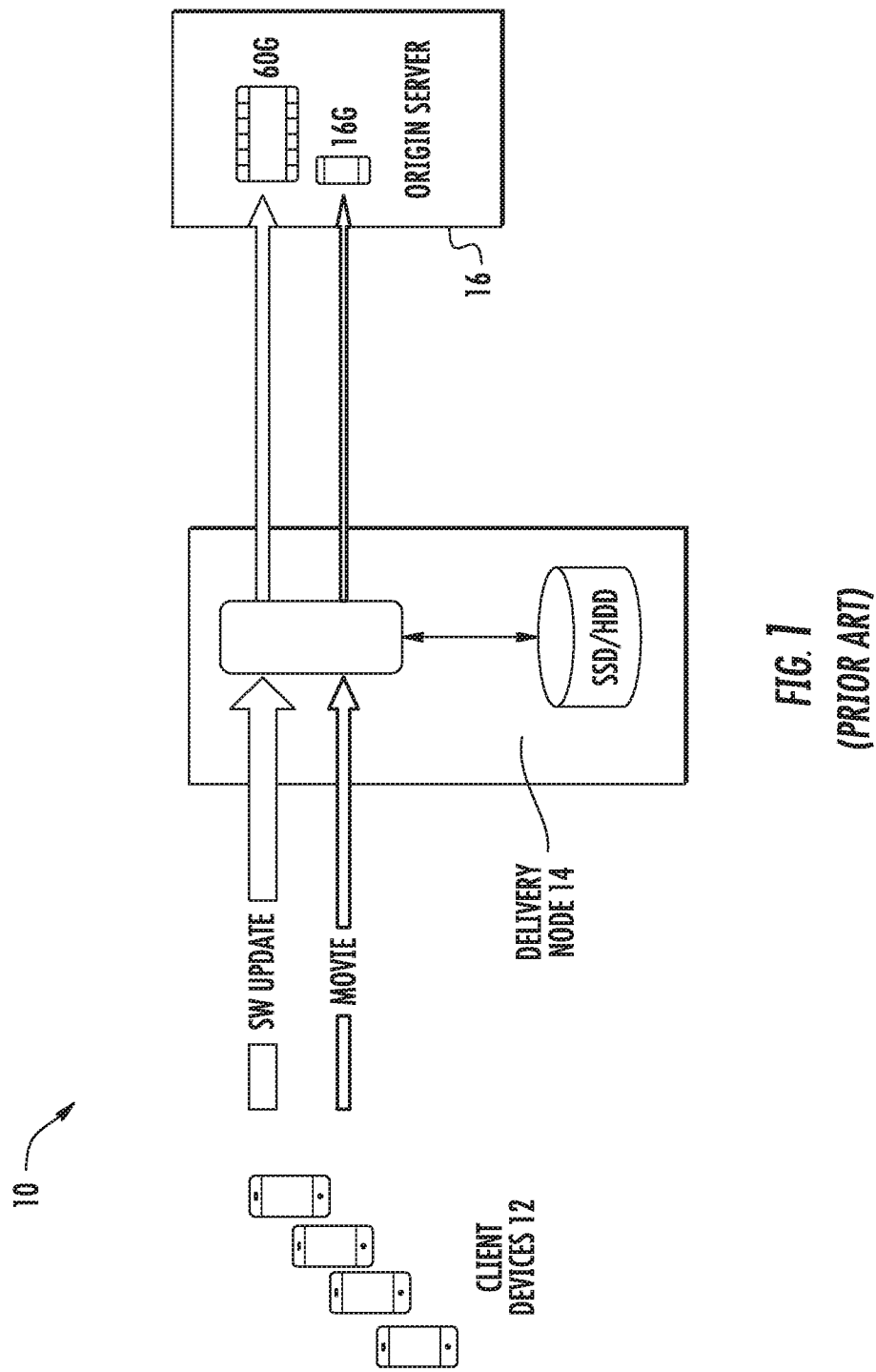
FIG. 1 is a block diagram of an existing BRC system that suffers from problems resulting from using a fixed chunk size for BRC.

The instant disclosure solves at least some of the problems with existing systems by providing a way to dynamically adjust chunk size to address the above-described issues. In other words, instead of preconfiguring or fixing a chunk size to be used for all requests for both homogenous and heterogeneous contents, the chunk size is dynamically adjusted as discussed herein.

Before describing in detail exemplary embodiments, it is noted that the embodiments reside primarily in combinations of apparatus components and processing steps related to methods, nodes and systems. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein.

As used herein, relational terms, such as "first," "second," "top" and "bottom", and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

Figure 2:
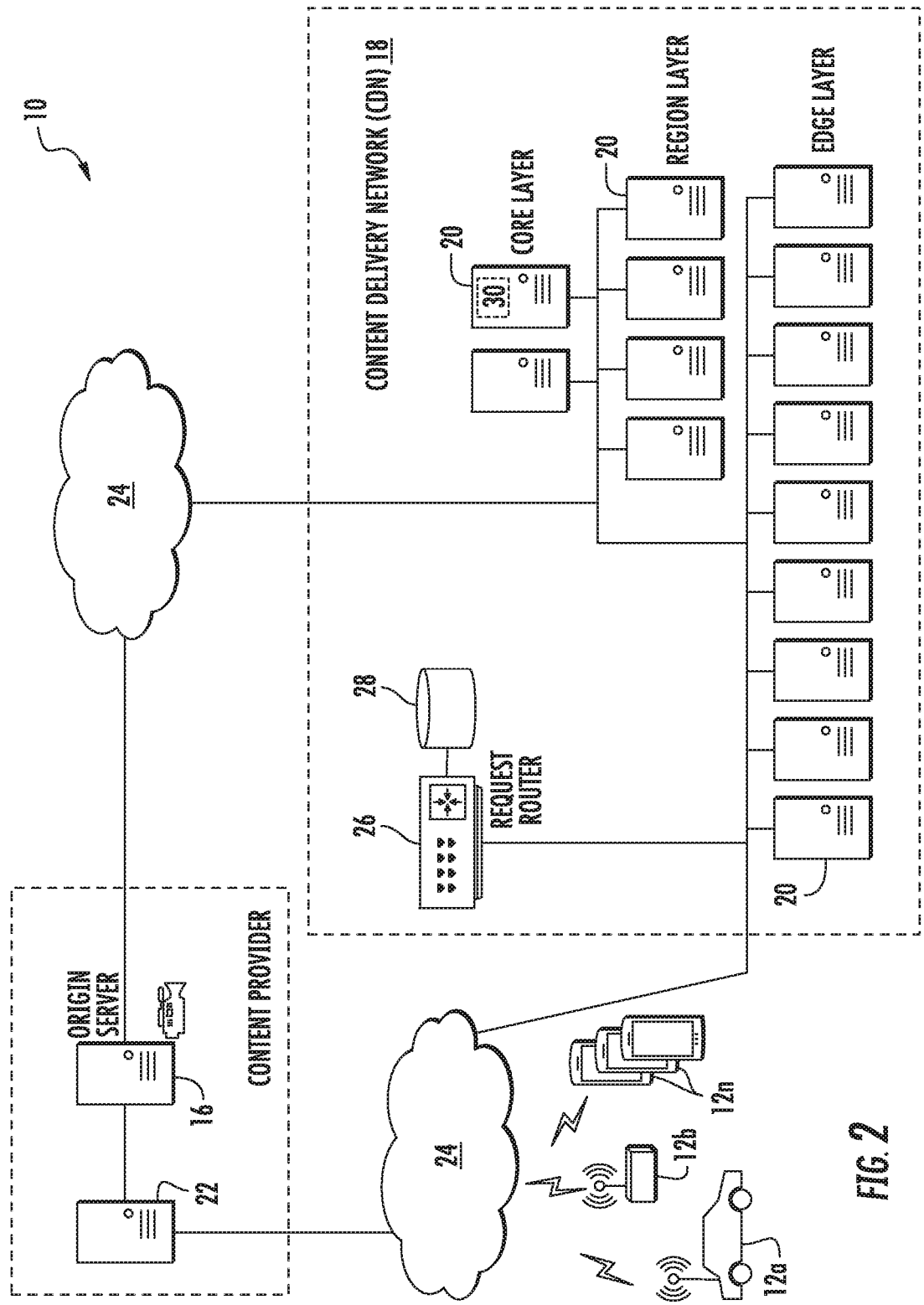
FIG. 2 is a block diagram of an example system for dynamically adjusting a chunk size in accordance with the principles of the disclosure.

Referring now to drawing figures in which like reference designators refer to like elements there is shown in FIG. 2 is a block diagram of an example system for dynamically adjusting a chunk size in accordance with the principles of the disclosure, where the system is generally referred to as system 10. In one or more embodiments, system 10 is a content delivery network (CDN) deployed with a layered structure. System 10 includes one or more client devices 12a-12n in communication with one or more network nodes 20a-20n via one or more communication networks, paths and/or links using one or more communication protocols, and one or more origin servers 16a-16n in communication with one or more network nodes 20a-20n via one or more communication networks, paths and/or links using one or more communication protocols. In one or more embodiment, network node 20 is a delivery node in Content Delivery Network 18 (CDN 18). As used herein, client device 12 refers to one or more of client devices 12a-12n, network node 20 refers to one or more of network nodes 20a-20n, and origin server 16 refers to one or more of origin servers 16a-16n. Client device 12 is configured communicate with network node 20 such as to communicate one or more client requests, i.e., byte-range request, for one or more contents, and to receive the requested content via a response from network node 20, as described herein.

Network nodes 20 are deployed in edge, region and core layers. Network node 20 at the edge layer face client devices 12 while the network nodes 20 at the core layer connect to the content provider's origin server 16. The content provider may also comprise a portal node 22 which provides Hyper Text Transfer Protocol (HTTP) access to internet protocol (IP) networks 24.

Request router 26 is usually responsible for redirecting CDN traffic, which comprises traffic between clients 12 and network nodes 20 at the edge layer, traffic among network nodes 20 at edge, region and core layers and traffic between network nodes 20 at core layers and content providers' origin server 16. Request router 26 can communicate with a database 28 containing the information about the accounts, service offering, network nodes 20 and origin server(s) 16; the database contains static information. Client devices 12 request content offered by the content provider. After a content-based hashing algorithm is applied by request router 26, network node 20 is selected to provide the content and may get the content from origin server 16. In one or more embodiments, network node 20 includes chunk adjustment code 30 for dynamically adjusting a chunk size as described herein.

Figure 3:
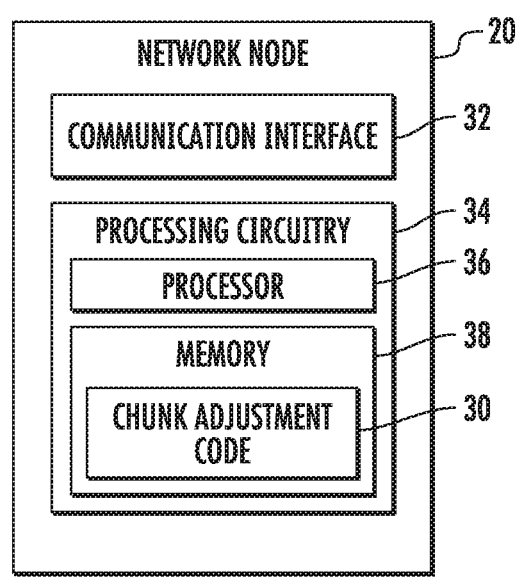
FIG. 3 is a block diagram of an exemplary network node in accordance with the principles of the disclosure.

FIG. 3 is a block diagram of an example network node 20 in accordance with the principles of the disclosure. Network node 20 includes one or more communication interfaces 32 for communicating with one or more client devices 12, one or more other network nodes 20 and/or one or more origin servers 16, among other entities in system 10. In one or more embodiments, communication interface 32 includes and/or is replaced with one or more transmitters and/or one or more receivers.

Network node 20 includes processing circuitry 34. Processing circuitry 34 includes processor 36 and memory 38. In addition to a traditional processor and memory, processing circuitry 34 may comprise integrated circuitry for processing and/or control, e.g., one or more processors and/or processor cores and/or FPGAs (Field Programmable Gate Array) and/or ASICs (Application Specific Integrated Circuitry). Processor 36 may be configured to access (e.g., write to and/or reading from) memory 38, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory). Such memory 38 may be configured to store code executable by processor 36 and/or other data, e.g., data pertaining to communication, e.g., configuration and/or address data of nodes, etc.

Processing circuitry 34 may be configured to control any of the methods and/or processes described herein and/or to cause such methods, signaling and/or processes to be performed, e.g., by network node 20. Processor 36 corresponds to one or more processors 36 for performing network node 20 functions described herein. Network node 20 includes memory 38 that is configured to store data, programmatic software code and/or other information described herein. In one or more embodiments, memory 38 is configured to store chunk adjustment code 30. For example, chunk adjustment code 30 includes instructions that, when executed by processor 36, cause processor 36 to perform the chunk adjustment process described herein with respect to FIG. 4. In one or more embodiments, network node 20 is a delivery node for delivering requested content, segments, etc., as described herein.

In one or more embodiments, the one or more Blocks denoted in dashed lines such as Blocks S101-S103 are optional, and may be omitted and/or skipped. Although embodiments are described herein with reference to certain functions being performed by network node 20, it is understood that the functions can be performed in other nodes and elements. It is also understood that the functions of the network node 20 can be distributed across the network cloud, such as the Internet or access network backhaul network, so that other nodes can perform one or more functions or even parts of functions described herein.

Origin server 16 is configured to store content, content segment(s), etc. in memory, and communicate the content, content segment(s), etc., in response to receiving one or more requests for one or more content, content segment(s), etc., as is known in the art.

Figure 4:
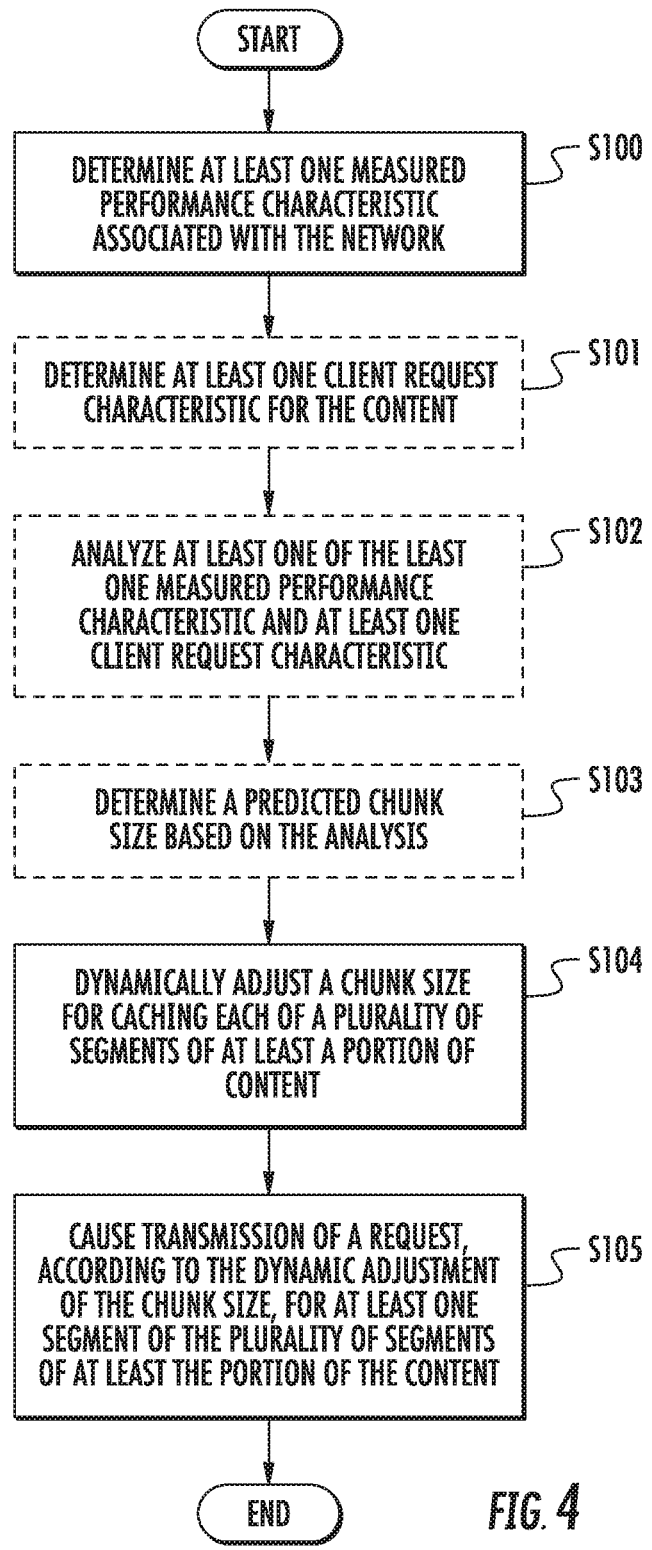
FIG. 4 is a flow diagram of an example chunk adjustment process of chunk adjustment code in accordance with the principles of the disclosure.

FIG. 4 is a flow diagram of an example chunk adjustment process of chunk adjustment code 30 in accordance with the principles of the disclosure. Processing circuitry 34 is configured to determine at least one measured performance characteristic associated with the network (Block S100). In one or more embodiments, the network refers to system 10 such that at least one measured performance characteristic associated with system 10 is determined. For example, in one or more embodiments, the at least one measured performance characteristic includes at least one from a group consisting of origin server feedback, network node usage and network usage, among other measurable performance characteristics associated with network node 20, origin server 16 and/or communicated between the network node 20 and origin server 16. In one or more embodiments, the at least one measured performance characteristics refers to at least one network side characteristic, where the network side includes network node 20 and origin server 16.

In one or more embodiments, origin server 16 feedback includes an indication of at least one of response time of origin server 16 and throughput of origin server 16. In one or more embodiments, network node usage indicates at least one from a group consisting of a type of file system operation and number of file system operations, where the file system is part or associated with network node 20. In one or more embodiments, network usage includes at least one of transportation performance measurements of the network, e.g., system 10, such as bandwidth, latency, etc.

Processing circuitry 34 is configured to determine at least one client request characteristic for the content, as described herein (Block S101). In one or more embodiments, the dynamic adjustment of the chunk size for caching each of the plurality of segments of at least the portion of content is based on the at least one client request characteristic. Processing circuitry 34 is configured to analyze at least one of at least one measured performance characteristic and at least one client request characteristic, as described herein (Block S102). Processing circuitry 34 is configured to determine a predicted chunk size based on the analysis, as described herein (Block S103). In one or more embodiments, the dynamic adjustment of the chunk size is based on the predicted chunk size.

Processing circuitry 34 is configured to dynamically adjust a chunk size for caching each of a plurality of segments of at least a portion of content, as described herein (Block S104). In one or more embodiments, the dynamic adjustment of the chunk size is based on the at least one measured performance characteristic associated with the network, i.e., system 10. In one or more embodiments, the chunk size is dynamically adjusted from an initial chunk size. For example, network node 20 has its initial chunk size set to a default value, e.g., a one megabyte chunk size. In one or more embodiments, the dynamic adjustment of the chunk size is based on at least one client request characteristic associated with the client request, i.e., byte-range request, for the content. In one or more embodiments, the at least one client request characteristic associated with a client device request for content includes at least one of a duration of a segment being requested and a size of a segment.

Processing circuitry 34 is configured to cause transmission of a content request, according to the dynamic adjustment of the chunk size, for at least one segment of the plurality of segments of at least the portion of the content, as described herein (Block S105). In one or more embodiments, the content request is a normalized byte-range request for content that is transmitted to origin server 16. In one or more embodiments, processing circuitry 34 causes transmission of the content request, according to the dynamic adjustment of the chunk size, to origin server 16 for at least one segment of the plurality of segments of at least the portion of the content, as described herein. In one or more embodiments, the dynamic adjustment of the chunk size is performed at a predefined time interval. In one or more embodiments, the dynamic adjustment of the chunk size is performed in response to: one or more client requests for content, one or more characteristics (described herein) that cause a triggering event, etc. The dynamic adjustment of the chunk size is further described herein.

Figure 5:
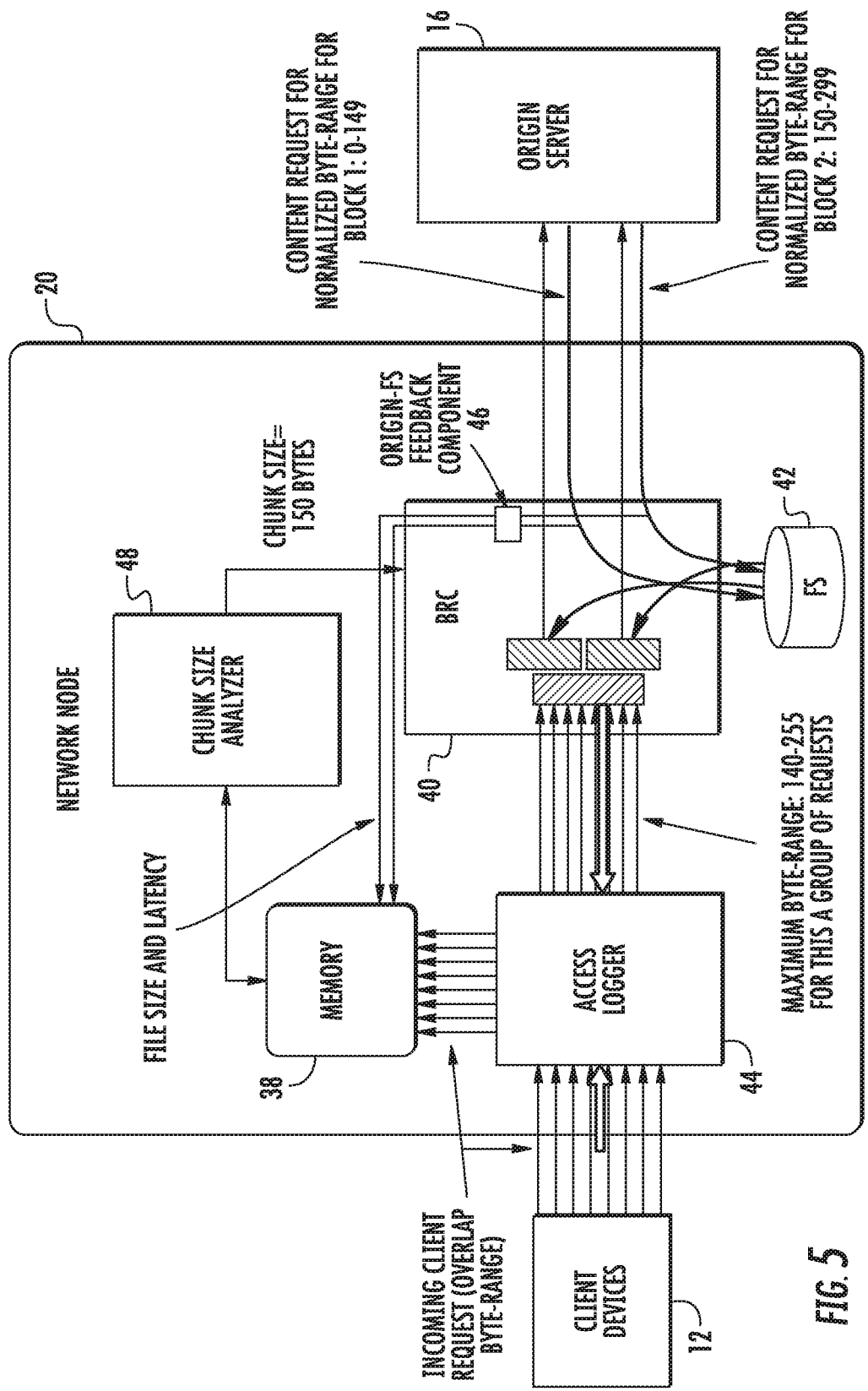
FIG. 5 is a block diagram of a more detailed view of FIG. 2.

FIG. 5 is a block diagram of client devices 12, network node 20 and origin server 16 of FIG. 2. In particular, software and/or hardware components of network node 20 are illustrated in detail. Network node 20 includes memory 38 as described above with respect of FIG. 3. Network node 20 includes BRC 40 for retrieving content and/or segments of content as is known in the art. Network node 20 includes file system or filesystem (FS) 42. In one or more embodiments, FS 42 is a hierarchical structure where files such as cached content and/or segments of content are stored, as is known in the art. While FIG. 5 illustrates the use of a chunk size of 150 bytes for communicating segment(s) of content communication between network node 20 and origin server 16, the specific chunk size is one example of a chunk size used for a content request, i.e., normalized byte-range request, for BRC, and other chunk sizes and normalized byte-ranges are equally applicable in accordance with the teachings of the disclosure. Further, the maximum byte-range for a group of requests, in one or more embodiments, may be different from byte-range 140-255 that is illustrated in FIG. 5.

Network node 20 includes one or more access logger/parser components 44 (referred to as access logger 44) in communication with memory 38 and BRC 40. Access logger 44 is configured to collect information associated with client requests for content, i.e., request for segment(s) of content. For example, in one or more embodiments, the collected information from one or more client requests includes at least one of a byte-range of content from the client request, requested content, access uniform resource locator (URL) associated with the content, among other information parsed from one or more client requests. In one or more embodiments, access logger 44 is implemented as a receiving request component. While access logger 44 is shown in network node 20, one or more access loggers 44, in one or more embodiments, are included in one or more other network nodes 20. In one or more embodiments, one or more access loggers 44 collect information associated with client requests for segment(s) of content for multiple network nodes 20.

Network node 20 includes one or more origin-FS feedback components 46. Origin-FS feedback component 46 is configured to collect information about origin server 16 and operations of FS 42. In one or more embodiments, the information about origin server 16 includes at least one of latency for receiving segment(s) of content from origin server 16 such as time-to-first-byte (TTFB) or time-to-last-byte (TTLB), bandwidth, response time, throughput, among other measurable performance characteristics. In one or more embodiments, the operations of FS 42 include at least one of READ/WRITE I/O, a number of files to be handled at the same time, file size, etc., among other measurable performance characteristics. In one or more embodiments, the information provided by access logger 44 and origin-FS feedback component 46 is stored in memory 38. While origin-FS feedback component 46 is shown as part of network node 20, in one or more embodiments, one or more origin-FS feedback components 46 may be included in one or more other network nodes 20. In one or more embodiments, one or more origin-FS feedback components 46 collect information associated with multiple origin servers 16 and operations of multiple FS 46. In other words, one or more origin-FS feedback components 46 can support multiple network nodes 20.

Network node 20 includes chunk size analyzer 48 for analyzing collected information from access logger 44 and origin-FS feedback component 46. In one or more embodiments, within a predefined time interval configurable based on performance tuning, chunk size analyzer 48 collects, from memory 38, the information provided by access logger 44 and origin-FS feedback component 46. In one or more embodiments, chunk size analyzer 48 calculates a chunk size or predicted chunk size, which can be used by BRC 40 of network node 20 to handle client requests for a next time interval, i.e., to handle byte-range requests for segment(s) of content for caching of the segment(s) of content in memory 38. In other words, in one or more embodiments, the segment size of content requested of origin server 16 by network node 20 is adjusted based on a calculated chunk size that adjusts the chunk size. In one or more embodiments, the adjusted chunk size corresponds to the calculated chunk size.

In one or more embodiments, the calculated chunk size is verified or bound by low and upper limits set according to the operational status, i.e., operational characteristic(s), of network node 20. The operational status may be at the node level such as to take into account measurable performance characteristics of network node 20, as described herein. In one or more embodiments, the content request transmitted to origin server 16 is a normalized byte-range range that is used for requesting segment(s) of content from origin server 16, and the response from origin server 16 corresponds to the normalized byte-range that was requested. In particular, a normalized byte-range refers to a configured byte-range for requesting segment(s) of content from origin server 16, as described herein. For example, an incoming client request for a byte range of bytes 140-255 of the content, may lead to requests for normalized byte ranges of bytes 0-149 and 150-299 of the content, thereby normalizing the client requested bytes to predefined byte-ranges. Also, access logger 44, origin-FS feedback component 46 and chunk size analyzer 48, as described herein, may be implemented as software (e.g., as part of code 30 or as part of other code stored in memory 38), hardware (e.g., performed by processing circuitry 34), one or more modules (e.g., such as part of chunk adjustment module 50 or other modules of network node 20) and/or a combination thereof.

While chunk size analyzer 48 is shown as being part of network node 20, one or more chunk size analyzers 48, in one or more embodiments, are included in one or more other network nodes 20. For instance, in one or more embodiments, one or more chunk size analyzers 48 analyze collected information from one or more access loggers 44 and one or more origin-FS feedback components 46 associated with one or more network nodes 20. Therefore, in one or more embodiments, a single chunk size analyzer 48 can provide analysis and chunk size determinations for multiple network nodes 20 and/or origin servers 16.

Figure 6:
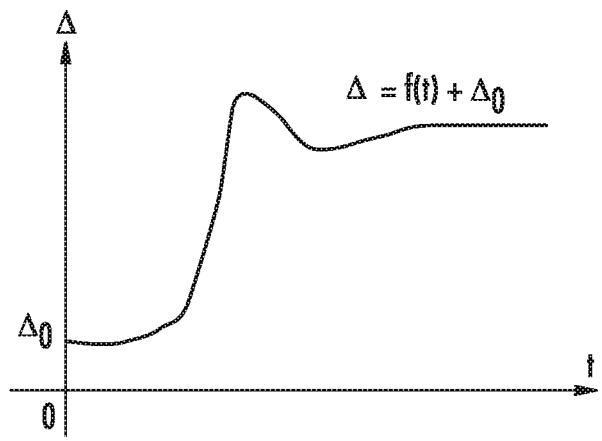
FIG. 6 is a graphical representation of one example of the dynamic adjustment of the chunk size in accordance with the principles of the disclosure.

FIG. 6 is a graphical representation of one example of the dynamic adjustment of the chunk size in accordance with chunk adjustment code 30 (illustrated in FIG. 3) and/or chunk size analyzer 48. For example, at a time, or time interval, network node 20 automatically and dynamically adjusts the chunk size that is used for requesting segment(s) of content from origin server 16, for storing segment(s) and for other functions described herein, thereby improving performance (latency, TTFB, TTLB) and storage usage in network node 20, i.e., caching server or delivery node. In the example of FIG. 6, the initial chunk size (Ao) is set to a default value, e.g., 1 MB. The dynamically adjusted chunk size is denoted as "A" which is based on function ($f$(t)) and the initial chunk size. As illustrated in FIG. 6, the chunk size is dynamically adjusted over time t based on one or more measured performance characteristics and/or one or more client request characteristics, as described herein, thereby improving performance of network node 20.

In one or more other embodiments, the chunk size is dynamically adjusted to correspond to a predicted chunk size ($\Delta_a$) determined by Equation 1.

$$\Delta_a = \frac{1}{M} \sum_{j=0}^{M} \beta_{t=t_j} * \Delta_{t=t_j} \qquad \text{Equation 1}$$

In Equation 1, M is the number of samples within a time period, B is the weighted latency or latency coefficients related to latency, and $\Delta_t$ is the average chunk size. In one or more embodiments, Equation 1 is used to calculate the predicted chunk size for servicing client request(s) at time $t=t_k$. In one or more embodiments, M is the number of samples taken from a time interval $[t_{k-M/2}, t_{k+M/2}]$. Weighted latency (B) is defined in Equation 2.

$$\beta_{t=t_k} = f(\mu_{t=t_k}) \qquad \text{Equation 2}$$

In particular, equation 2 is used to calculate the weighted latency, i.e., weight coefficients related to latency, which is used to calculate the dynamic chunk size as illustrated in Equation 1. Function $f(\ )$ is a function of origin server 16 latency. Further, latency at time t ($\mu_t$) is defined in Equation 3.

$$\mu_{t=t_k} = \frac{\sum_{i=0}^{L} N_i \alpha_i}{\sum_{i=0}^{L} N_i} \qquad \text{Equation 3}$$

Figure 7:
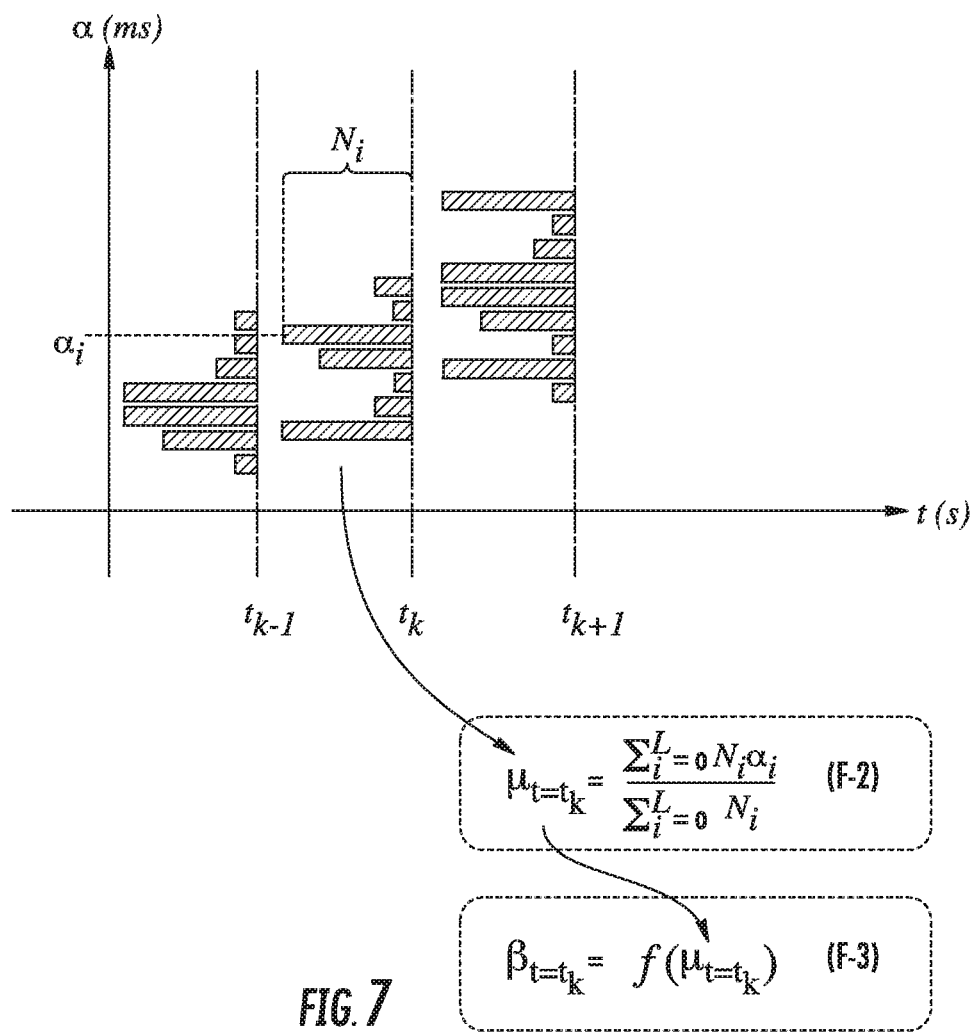
FIG. 7 is a graph mapping latency from origin server over a time interval in accordance with the principles of the disclosure.

In Equation 3, $N_i$ is the number of requests, e.g., content requests, or responses to the requests, and $\alpha_i$ is the latency related to origin server 16 response to content requests from network node 20. In other words, Equation 3 is used to calculate the average latency related to origin server 16 responses at $t=t_k$. In one example, $\mu_t$ is illustrated in FIG. 7. In particular, FIG. 7 is a graph mapping latency from origin server 16 over time intervals in accordance with the principles of the disclosure, as discussed in detail below. Referring back to Equation 1, $\Delta_t$ is defined by equation 4.

$$\Delta_{t=t_k} = \frac{\sum_{i=0}^{L} N_i \delta_i}{\sum_{i=0}^{L} N_i} \qquad \text{Equation 4}$$

Figure 8:
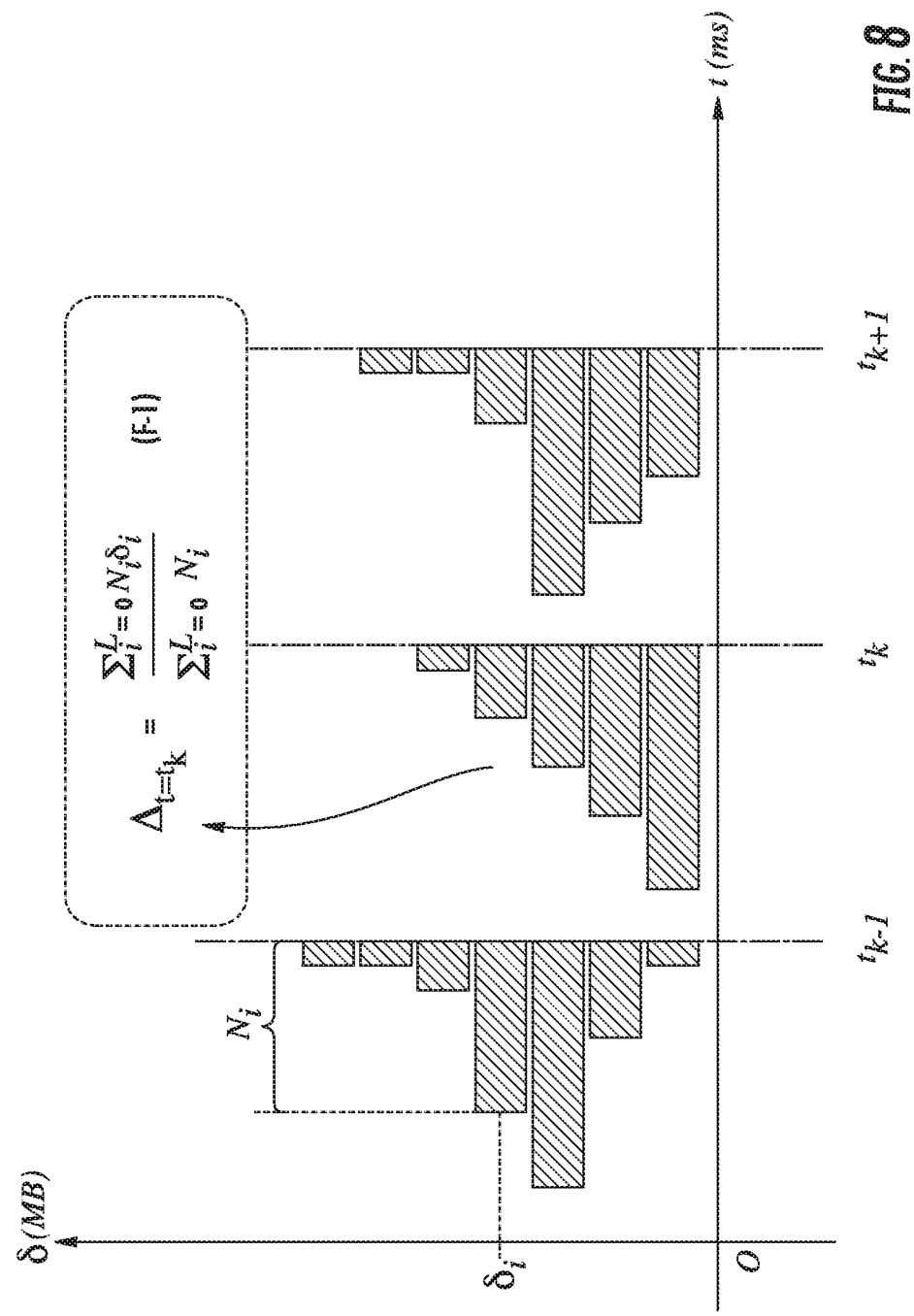
FIG. 8 is a graph mapping chunk sizes from incoming requests over time interval in accordance with the principles of the disclosure.

In Equation 4, $\Delta_t$ relates to chunk sizes of incoming client requests for content. In particular, $\delta_i$ is the segment size in the client request from client device 12. Equation 4 is used to calculate the average chunk size ($\Delta_t$) required in client requests at $t=t_k$. In one or more embodiments, $\Delta_t$ is illustrated in FIG. 8. FIG. 8 is a graph mapping segment sizes from incoming client requests over time intervals in accordance with the principles of the disclosure, as discussed in detail below. In other words, in one or more embodiments, the algorithm for calculating an average chunk size for a next time interval is based on both incoming client requests, i.e., client request characteristics, and origin server 16 response characteristics, i.e., measured performance characteristics.

In other words, FIGS. 7 and 8 are block diagrams relating to respective portions of Equation 1 that are used to predict a chunk size. In particular, FIG. 7 is a block diagram of an example of latency from origin server 16 response(s) over time in which the data illustrated in FIG. 7 is used in equations 2-3 and in the $\beta_{t=t_j}$ portion of equation 1 for performing calculations. Latency related to origin server 16's responses is illustrated in FIG. 7, where the length of each bar indicates the number of requests ($N_i$), e.g., content requests from network node 20, where the level of the bar corresponds to the latency ($\alpha_i$). In FIG. 7, a is in units of milliseconds (ms) and t is in units of seconds (s).

FIG. 8 is a block diagram of the segment size from incoming client requests in which the segment size is used in equation 4 and in the $\Delta_{t=t_j}$ portion of Equation 1 for performing calculations. A distribution of the segment sizes in the client requests for contents, i.e., in the byte-range requests, is illustrated in FIG. 8 where segment size 6 is in units of megabytes (MB) and time t is in units of millisecond(s). The length of each bar indicates the number of client requests, i.e., $N_i$, and the level of the bar corresponds to the segment size, i.e., $\delta_i$.

FIG. 9 is a block diagram illustrating an example information received from access logger 44 and origin-FS feedback component 46 in accordance with the principles of the disclosure. For example, in one or more embodiments, access logger 44 provides the following information based on client requests: content URL, time interval, accumulated byte ranges from client requests and number of client requests, i.e., counts. In one or more embodiments, origin-FS feedback component 42 provides the following information associated with origin server 16: latency from origin server 16 and total content size. While the example of FIG. 9 includes various pieces of information received from access logger 44 and origin-FS feedback component 46, the information received at memory 38 and/or used by chunk size analyzer 48 may be different, i.e., may include more or less information and/or different characteristics. In other words, the details shown in FIG. 9 are merely an example.

Figure 10:
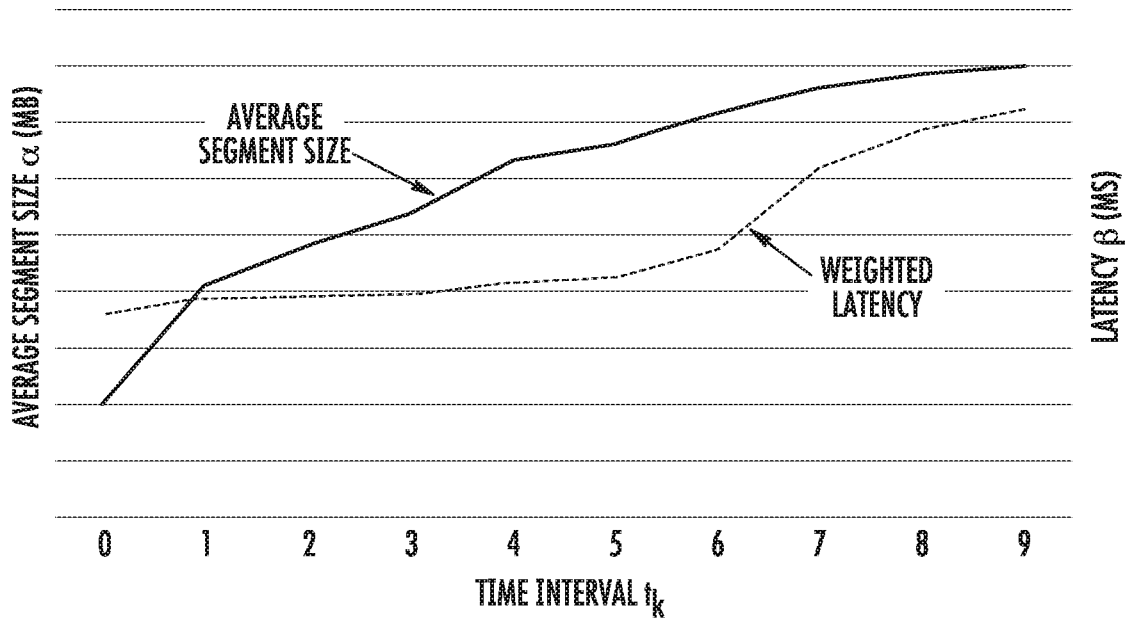
FIG. 10 is a mapping of the average chunk size a time interval and a mapping of weighted latency the time interval in accordance with the principles of the disclosure.
Figure 11:
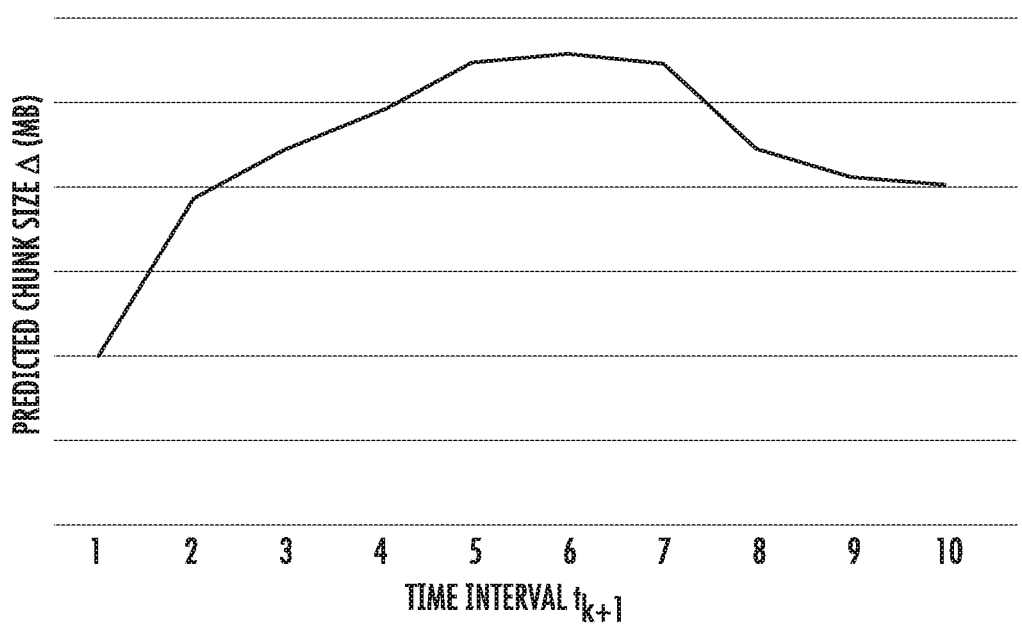
FIG. 11 illustrates a mapping of the predicted chunk size over time interval in accordance with the principles of the disclosure.

FIG. 10 is a mapping of an example of an average segment size calculated using equation 4 over time interval $t_k$, and a mapping of weighted latency using equation 2 over time interval $t_k$, in accordance with the principles of the disclosure. In particular, given an increase in the average requested segment size in client requests, calculated using equation 4, and the stable weighted latency (B), determined using equation 2, for $t_k=0$ to $t_k=5$, the predicted chunk size that is calculated using equation 1 increases as illustrated in FIG. 11. In particular, FIG. 11 illustrates a mapping of the predicted chunk size calculated using equation 1 over time interval $t_{k+1}$ in accordance with the principles of the disclosure. As can be seen based on FIGS. 10 and 11, as latency increases after time interval $t_k=6$, the resulting predicted chunk size is reduced.

Figure 12:
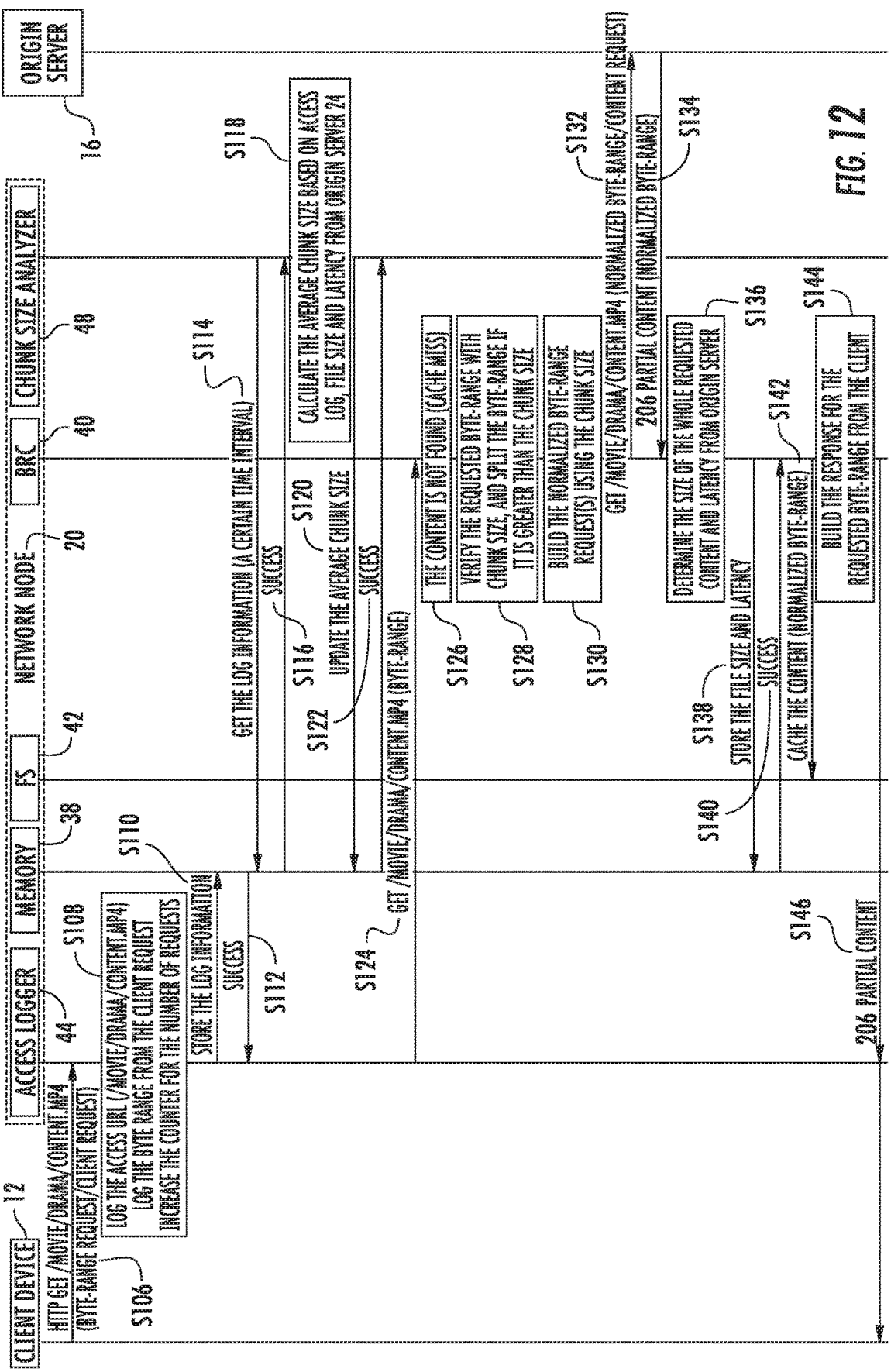
FIG. 12 is a signaling diagram of an example of signaling among client device, network node and origin server in accordance with the principles of the disclosure.

FIG. 12 is a signaling diagram of an example of signaling among client device 12, network node 20 and origin server 16 in which the chunk size is dynamically adjusted, in one or more embodiments, after the client request for segment(s) of content is received, and the client request is serviced according to the dynamically adjusted chunk size for retrieving segment(s) of content from origin server 16, in accordance with the principles of the disclosure. Client device 12 communicates a client request, i.e., a byte-range request, to network node 20 for segment(s) of content (Block S106). In this example, client device 12 communicates, i.e., transmits, an HTTP GET request for "/movie/drama/content.mp4" for a specific byte-range of the content. Access logger 44 logs the access URL, i.e., "/movie/drama/content.mp4" in this example, logs the byte-range from the client request and increases the counter for the number of client requests (Block S108). In one or more embodiments, access logger 44 logs a one or more client request characteristics such as those discussed herein.

Access logger 44 provides the client request characteristics to memory 38 for storage (Block S110). Memory 38 confirms the storage of the received client request characteristics, in this example, via a success message, although other acknowledgment or confirmation message(s) may be used (Block S112). Chunk size analyzer 48 requests log information from memory 38 (Block S114). The log information includes information provided by access logger 44 and/or origin-FS feedback component 46, not illustrated in FIG. 11. In one or more embodiments, Block S114 is performed at a predefined time interval, in response to a client request for content, in response to a threshold being met or in response to another triggering event. The threshold may correspond to a number of requests received for one or more segment(s) of contents, a predefined increase in the calculated average chunk size, one or more values of one or more measured performance characteristics or other value associated with system 10. Memory 38 provides the requested log information to chunk size analyzer 48 (Block S116).

Chunk size analyzer 48 calculates the chunk size such as the predicted chunk size, in this example, based on at least one of the access log information, file size and latency from the origin server 16 (Block S118). Chunk size analyzer 48 updates the chunk size value stored in memory 38 (Block S120). Therefore, subsequent content requests for segment(s) of content(s) for serving client request(s) will be requested in accordance with the dynamically updated chunk size value. Memory 38 confirms the updated chunk size via a success message (Block S122). In one or more embodiments, Blocks S114-S122 are performed at a predefined time interval. In one or more other embodiments, Blocks S114-S122 are performed in response to a triggering event as described herein. In other words, in one or more embodiments, one or more of Blocks S114-S122 may be performed before a client request is received or after a client request is received. In one or more embodiments, Blocks S114-S122 are performed by a dedicated processor 36, not illustrated in FIG. 11, to minimize traffic impact.

Access logger 44 communicates the client request, i.e., byte-range request for segment(s) of content, to BRC 40 (Block S124). BRC 40 determines the content is not found or cached, i.e., cache miss, as is known in the art (Block S126). BRC 40 verifies the requested byte-range in the client request with the chunk size stored in memory 38 and splits the byte-range if the requested byte-range is greater than the chunk size stored in memory, i.e. updated chunk size or predicted chunk size (Block S128). BRC 40 builds a normalized byte-range for the content request(s) using the chunk size stored in memory, i.e., the chunk size calculated at Block S118 (Block S130). For example, the normalized byte-range will request one or more segment(s) of content where each segment has a segment size corresponding to the average chunk size or predicted chunk size. BRC 40 communicates the content request, i.e., normalized byte-range request, for segment(s) of content to origin server 16 via a Get message (GET/movie/drama/content.mp4 (normalized byte-range request)) (Block S132). BRC 40 receives the requested content, e.g., receives "206 Partial Content" (normalized byte-range response) (Block S134).

BRC 40 determines the size of the entire requested segment(s) of content, i.e., file size, and latency from origin server 16 (Block S136). BRC 40 causes the file size and latency to be stored in memory 38 (Block S138). Memory 38 confirms the file size and latency have been stored (Block S140). BRC 40 causes the normalized byte-range of segment(s) of content to be cached in memory 38 (Block S142). BRC 40 builds a response for the requested byte-range for client device 12 (Block S144). BRC 40 communicates the partial content requested by client device 12 to access logger 44 for communication to client device 12, thereby servicing the client request (Block S146).

Figure 13:
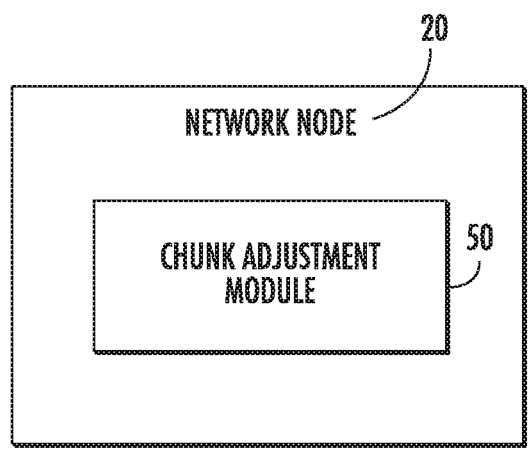
FIG. 13 is a block diagram of an alternative network node in accordance with the principles of the disclosure.

FIG. 13 is a block diagram of an alternative network node 20 in accordance with the principles of the disclosure. Network node 20 includes chunk adjustment module 50 for performing the chunk adjustment process as described above with respect to chunk adjustment code 30 and chunk size analyzer 48.

In some embodiments:

A network node 20 operative to adjust chunk size is provided. Network node 20 includes processing circuitry 34 having processor 36 and memory 38. Memory 38 includes executable instructions which, when executed by the processor 36, configure the processor 36 to: determine at least one measured performance characteristic associated with the network, dynamically adjust a chunk size for caching each of a plurality of segments of at least a portion of content, cause transmission of a content request, according to the dynamic adjustment of the chunk size, for at least one segment of the plurality of segments of at least the portion of the content. The dynamic adjustment of the chunk size is based on the at least one measured performance characteristic associated with the network.

A method for a network node 20 operative to adjust chunk size is provided. At least one measured performance characteristic associated with the network is determined (Block S100). A chunk size for caching each of a plurality of segments of at least a portion of content is dynamically adjusted (Block S104). The dynamic adjustment of the chunk size is based on the at least one measured performance characteristic associated with the network. Transmission of a content request is caused, according to the dynamic adjustment of the chunk size, for at least one segment of the plurality of segments of at least the portion of the content (Block S105).

A network node 20 operative to adjust chunk size is provided. Network node 20 includes chunk adjustment module 50 configured to: determine at least one measured performance characteristic associated with the network, dynamically adjust a chunk size for caching each of a plurality of segments of at least a portion of content, and cause transmission of a content request, according to the dynamic adjustment of the chunk size, for at least one segment of the plurality of segments of at least the portion of the content. The dynamic adjustment of the chunk size is based on the at least one measured performance characteristic associated with the network.

As will be appreciated by one of skill in the art, the concepts described herein may be embodied as a method, data processing system, and/or computer program product. Accordingly, the concepts described herein may take the form of an entirely hardware embodiment, an entirely software embodiment or an embodiment combining software and hardware aspects all generally referred to herein as a "circuit" or "module". Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer (to thereby create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks. It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object-oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. A network node configured to adjust chunk size, the network node comprising:
   processing circuitry having a processor and memory, the memory including executable instructions which, when executed by the processor, configure the processor to:
   determine at least one measured performance characteristic associated with a network, the at least one measured performance characteristic indicating at least one of a type of file system operation and a number of file system operations;
   dynamically adjust a chunk size for caching each of a plurality of segments of at least a portion of content, the dynamic adjustment of the chunk size being based on the at least one measured performance characteristic indicating at least one of a type of file system operation and a number of file system operations associated with the network; and
   cause transmission of a content request, according to the dynamic adjustment of the chunk size, for at least one segment of the plurality of segments of at least the portion of the content.

2. The network node of claim 1, wherein the memory includes further instructions which, when executed by the processor, configure the processor to:
   determine at least one client request characteristic for the content, the dynamic adjustment of the chunk size for caching each of the plurality of segments of at least the portion of content being based on the at least one client request characteristic.

3. The network node of claim 2, wherein the at least one client request characteristic for the content includes at least one of:
   a duration of a segment; and
   segment size.

4. The network node of claim 1, wherein the memory includes further instructions which, when executed by the processor, configure the processor to:
   analyze at least one of at least one measured performance characteristic and at least one client request characteristic;
   determine a predicted chunk size based on the analysis; and
   the dynamic adjustment of the chunk size being based on the predicted chunk size.

5. The network node of claim 4, wherein the analysis includes analyzing:
   previous values of the at least one measured performance characteristic; and
   at least one size of a previously adjusted chunk size.

6. The network node of claim 4, wherein the analysis includes analyzing:
   an average segment size; and
   at least one average value of the at least one measured performance characteristic.

7. The network node of claim 1, wherein the at least one measured performance characteristic associated with the network includes at least one from a group consisting of:
   origin server feedback;
   network node usage; and
   network usage.

8. The network node of claim 7, wherein the origin server feedback includes an indication of at least one of response time of the origin server and throughput of the origin server.

9. The network node of claim 1, wherein the memory includes further instructions which, when executed by the processor, configure the processor to receive a client request for the content; and
   the dynamic adjustment of the chunk size for caching each of the plurality of segments of at least the portion of the content being based on a number of client requests received for the content.

10. The network node of claim 1, wherein the dynamic adjustment of the chunk size for caching each of the plurality of segments of at least the portion of content is performed at a predefined time interval.

11. The network node of claim 1, wherein the memory includes further instructions which, when executed by the processor, configure the processor to:
    determine a lower chunk size limit for the chunk size based on at least one operational characteristic of the network node;
    determine an upper chunk size limit for the chunk size based on at least one operational characteristic of the network node; and
    the dynamic adjustment of the chunk size for caching each of the plurality of segments of at least the portion of content being bound by the lower chunk size limit and upper chunk size limit.

12. The network node of claim 1, wherein the content request, according to the dynamic adjustment of the chunk size for caching each of the plurality of segments of at least the portion of content, is transmitted to one of a group consisting of a file system of the network node and an origin server.

13. The network node of claim 1, wherein the memory further includes executable instructions which, when executed by the processor, configure the processor to:
    dynamically adjust the chunk sizes for a plurality of network nodes; and
    cause transmission of data defining the dynamic adjustment of the chunk sizes to use for corresponding content requests to at least one of a group consisting of the plurality of network nodes and at least one origin server having at least one corresponding network node.

14. A method for a network node configured to adjust chunk size, the method comprising:
    determining at least one measured performance characteristic associated with a network, the at least one measured performance characteristic indicating at least one of a type of file system operation and a number of file system operations;
    dynamically adjusting a chunk size for caching each of a plurality of segments of at least a portion of content, the dynamic adjustment of the chunk size being based on the at least one measured performance characteristic indicating at least one of a type of file system operation and a number of file system operations associated with the network; and
    causing transmission of a content request, according to the dynamic adjustment of the chunk size, for at least one segment of the plurality of segments of at least the portion of the content.

15. The method of claim 14, further comprising determining at least one client request characteristic for the content, the dynamic adjustment of the chunk size for caching each of the plurality of segments of at least the portion of content being based on the at least one client request characteristic.

16. The method of claim 15, wherein the at least one client request characteristic associated with a user request for the content includes at least one of:
    a duration of a segment; and
    segment size.

17. The method of claim 14, further comprising:
    analyzing at least one of at least one measured performance characteristic and at least one client request characteristic;
    determining a predicted chunk size based on the analysis; and
    the dynamic adjustment of the chunk size being based on the predicted chunk size.

18. The method of claim 17, wherein the analysis includes analyzing:
    previous values of the at least one measured performance characteristic; and
    at least one size of a previously adjusted chunk size.

19. The method of claim 17, wherein the analysis includes analyzing:
    an average segment size; and
    at least one average value of the at least one measured performance characteristic.

20. The method of claim 14, wherein the at least one measured performance characteristic associated with the network includes at least one from a group consisting of:
    origin server feedback;
    network node usage; and
    network usage.

21. The method of claim 20, wherein the origin server feedback includes an indication of at least one of response time of the origin server and throughput of the origin server.

22. The method of claim 14, further comprising receiving a client request for the content; and
the dynamic adjustment of the chunk size for caching each of the plurality of segments of at least the portion of the content being based on a number of client requests received for the content.

23. The method of claim 14, wherein the dynamic adjustment of the chunk size for caching each of the plurality of segments of at least the portion of content is performed at a predefined time interval.

24. The method of claim 14, further comprising:
determining a lower chunk size limit for the chunk size based on at least one operational characteristic of the network node;
determining an upper chunk size limit for the chunk size based on at least one operational characteristic of the network node; and
the dynamic adjustment of the chunk size for caching each of the plurality of segments of at least the portion of content being bound by the lower chunk size limit and upper chunk size limit.

25. The method of claim 14, wherein the content request, according to the dynamic adjustment of the chunk size for caching each of the plurality of segments of at least the portion of content, is transmitted to one of a group consisting of a file system of the network node and an origin server.

26. The method of claim 14, further comprising:
dynamically adjusting the chunk sizes for a plurality of network nodes; and
causing transmission of data defining the dynamic adjustment of the chunk sizes to use for corresponding content requests to at least one of a group consisting of the plurality of network nodes and at least one origin server having at least one corresponding network node.

27. A network node configured to adjust chunk size, the network node comprising:
chunk adjustment processing circuitry configured to:
determine at least one measured performance characteristic associated with a network, the at least one measured performance characteristic indicating at least one of a type of file system operation and a number of file system operations;
dynamically adjust a chunk size for caching each of a plurality of segments of at least a portion of content, the dynamic adjustment of the chunk size being based on the at least one measured performance characteristic indicating at least one of a type of file system operation and a number of file system operations associated with the network; and
cause transmission of a content request, according to the dynamic adjustment of the chunk size, for at least one segment of the plurality of segments of at least the portion of the content.

* * * * *